United States Patent [19]
Gennaro

[11] Patent Number: 5,320,306
[45] Date of Patent: Jun. 14, 1994

[54] AIRCRAFT CONSTRUCTION

[76] Inventor: Mark A. Gennaro, 27795 Abadejo, Mission Viejo, Calif. 92692

[21] Appl. No.: 960,939

[22] Filed: Oct. 14, 1992

[51] Int. Cl.⁵ .............................................. B64C 3/38
[52] U.S. Cl. .................................... 244/45 R; 244/55
[58] Field of Search ...................... 244/45 R, 55, 91; D12/331, 339, 319

[56] References Cited

U.S. PATENT DOCUMENTS

| D. 78,838 | 6/1929 | Orsett | D12/331 |
|---|---|---|---|
| D. 199,549 | 11/1964 | Thomas | D12/331 |
| D. 280,892 | 10/1985 | Mazzoni | D12/332 |
| D. 311,720 | 10/1990 | Butler | D12/331 |
| D. 323,315 | 1/1992 | Haga | D12/331 |
| D. 326,255 | 5/1992 | Graham | D12/331 |
| 1,058,983 | 4/1913 | Kikut | 244/45 R |
| 1,858,762 | 5/1932 | Bellanca | 244/55 |
| 2,402,311 | 6/1946 | Bissett | 244/45 R |
| 4,598,888 | 7/1986 | Beteille | 244/76 R |
| 4,746,081 | 5/1988 | Mazzoni | 244/45 R |
| 4,848,700 | 7/1989 | Lockheed | 244/45 A |
| 4,881,701 | 11/1989 | Bullard | 244/49 |
| 5,098,034 | 3/1992 | Lendriet | 244/39 |

FOREIGN PATENT DOCUMENTS

| 0931244 | 11/1948 | France | 244/55 |
|---|---|---|---|
| 1218566 | 5/1960 | France | 244/45 R |
| 1480353 | 5/1967 | France | 244/45 R |
| 1499852 | 11/1967 | France | 244/55 |
| 0216601 | 6/1924 | United Kingdom | 244/45 R |

OTHER PUBLICATIONS

Ratan "Ratan's Coverd Wing" Flight International, Jun. 3, 1978.

Primary Examiner—Margaret A. Focarino
Assistant Examiner—Christopher P. Ellis
Attorney, Agent, or Firm—Richard L. Myers

[57] ABSTRACT

An aircraft construction includes a fuselage, a first engine mounted on an axis extending through the fuselage for pulling the aircraft, and a second engine vertically offset from the first engine and mounted on an axis extending through the fuselage for pushing the aircraft. A main wing is disposed generally in a first plane and a tail wing is disposed generally in a second plane. A Canard wing may be disposed in a third plane different than the first plane and the second plane. Vertical stabilizers positioned to extend downwardly from the tail wing support drag wheels to protect the second engine during takeoff.

13 Claims, 6 Drawing Sheets

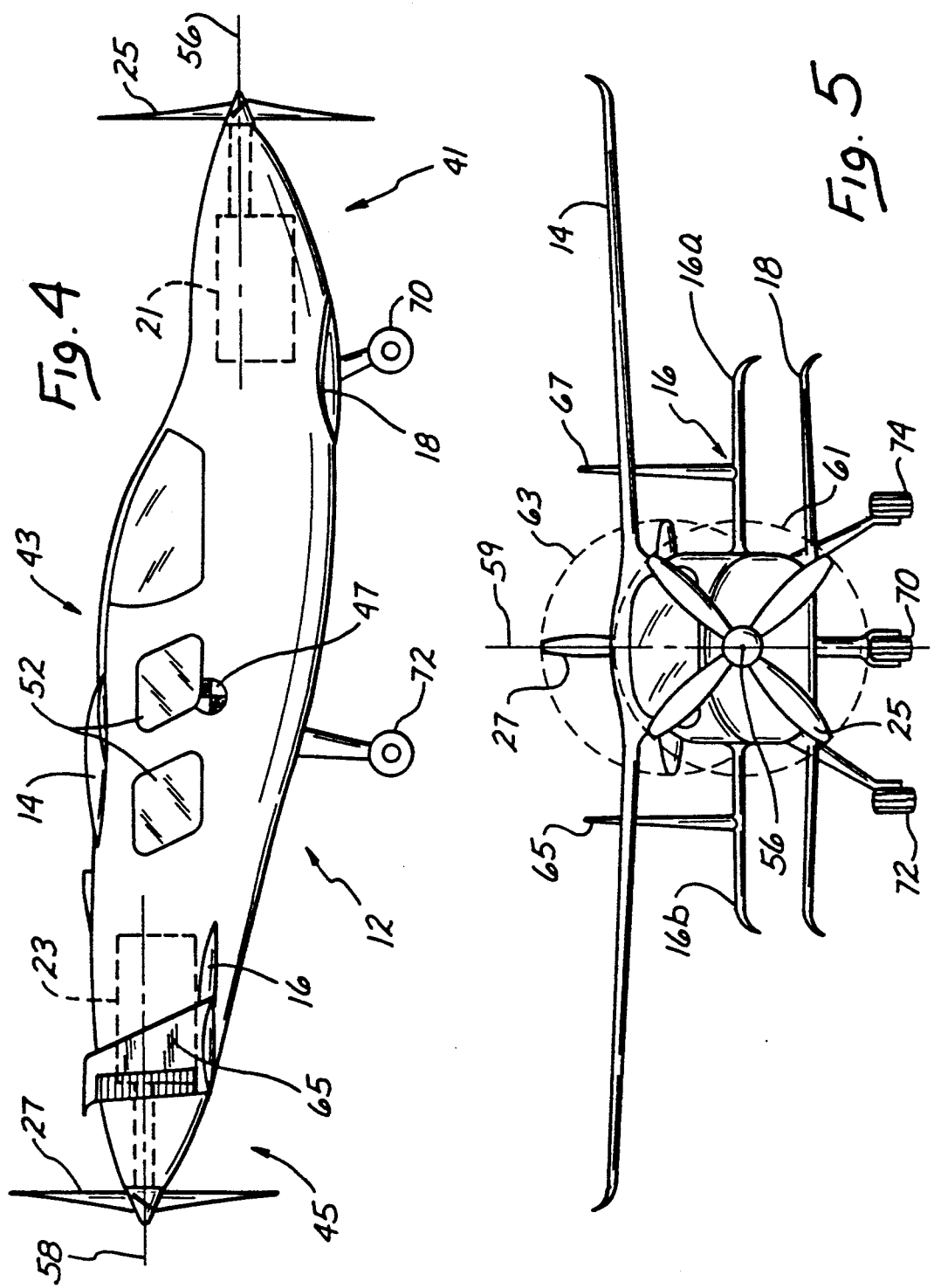

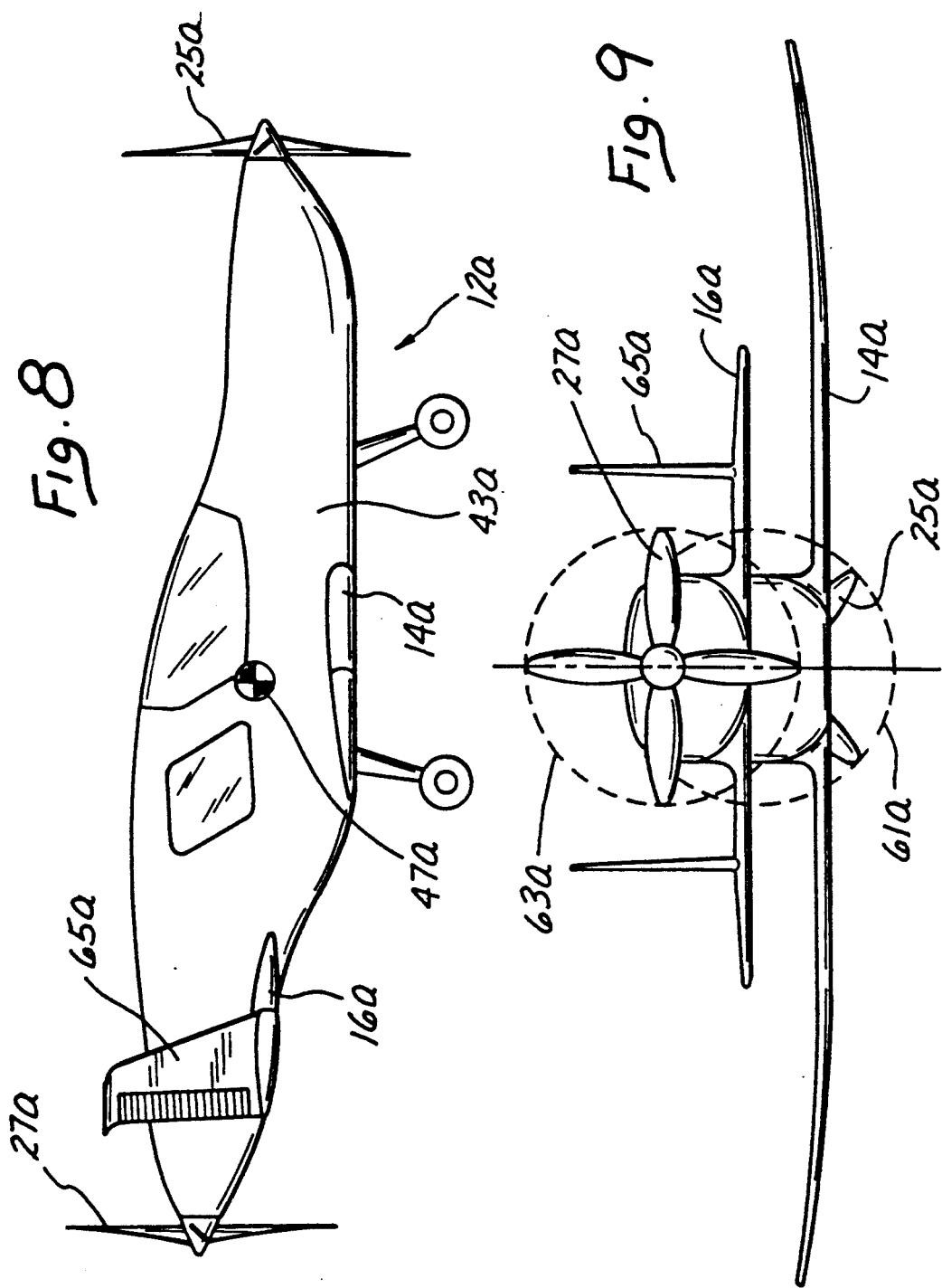

AIRCRAFT CONSTRUCTION

BACKGROUND OF THE INVENTION

1. Field of the Invention

This invention relates generally to vehicle which are heavier than air, and more specifically to aircraft constructions involving multiple engines and wings.

2. Discussion of the Prior Art

Since the beginning of flight, aircraft constructions providing increased safety and reliability have been of particular interest. This is especially true with respect to the smaller private aircraft where many of the safety features available on larger aircraft have not been economically justifiable. Smaller aircraft which are designed to carry fewer passengers, have also suffered from the need to provide economy not only in the purchase of the aircraft but also in its operation and maintenance. Such configurations commonly include a single engine having a pull propeller at the nose of the aircraft. When this single engine has failed, an emergency landing, often with fatal consequences, has been required.

In some cases, a single engine has been disposed in the rear of the aircraft and provided with a push propeller. In either location, the single engine generates an undesirable reverse torque on the aircraft along the roll axis. This reverse torque has required the pilot to provide a counter torque in the flight characteristics of the aircraft.

Aircraft of the past have commonly included a fixed main wing disposed generally centrally of the aircraft, and a tail wing disposed at the rear of the aircraft. Vertical stabilizers have typically been positioned to extend upwardly from the tail wing. A forward wing, commonly referred to as a Canard wing, has also been provided to facilitate forward control of the aircraft. Often these three wings have been positioned in generally common planes so that the slip stream of one wing has tended to interfere with the control characteristics of the other wing.

Landing systems have commonly supported aircraft in a horizontal position with a nose wheel, and a pair of main wheels extending laterally from the fuselage. This type of landing structure is susceptible to tail drag particularly during take-off at an excessive angle. Forward engine aircraft have been provided with tail wheels mounted to the fuselage to avoid this contact between the tail and the ground. Unfortunately, rear engine aircraft include propellers which often extend beneath the fuselage. In such cases, tail wheels attached to the fuselage have not provided adequate protection for the aircraft.

SUMMARY OF THE INVENTION

In accordance with the present invention, a pair of engines are provided, one at the front of the aircraft and one at the rear of the aircraft. These engines torque the aircraft in opposite directions so there is substantially no roll torque to be corrected. These engines are disposed on different vertical axes so the tail propeller receives at least a portion of its air from outside the wash of the nose propeller.

A preferred embodiment of the invention includes a main wing disposed above the fuselage of the aircraft and a tail wing which is disposed below the main wing and forward of the tail propeller. Vertical stabilizers can be positioned along the tail wing and in a preferred embodiment directed downwardly to support a drag wheel. This is of particular interest to embodiments wherein the tail propeller is disposed at the furthest end of the aircraft.

In other embodiments, a Canard wing can be provided and disposed in a plane different from the planes associated with the main wing and the tail wing. This insures that each of the wings receives a generally undisturbed flow of air to facilitate its control characteristics. Ailerons associated with the Canard wing and the tail wing are operable in tandem to provide a high degree of control over the pitch characteristics of the aircraft. Also, by controlling the lift characteristics of the Canard wing relative to the tail wing, the stall characteristics of the aircraft can be adjusted so that the airplane automatically tends to dive from a stall condition.

All of these features add to the safety and reliability of the aircraft. They are easily accommodated in a small private aircraft as well as larger commercial aircraft.

These and other features and advantages of the invention will be more apparent with a description of preferred embodiments and reference to associated drawings.

DESCRIPTION OF THE DRAWINGS

FIG. 4 is a side elevation view of the aircraft illustrated in FIG. 1;

FIG. 5 is a front elevation view of the aircraft illustrated in FIG. 1;

FIG. 8 is a side elevation view of the aircraft illustrated in FIG. 7; and

FIG. 9 is a elevation view of the aircraft illustrated in FIG. 7.

DESCRIPTION OF PREFERRED EMBODIMENTS

Figure 1:
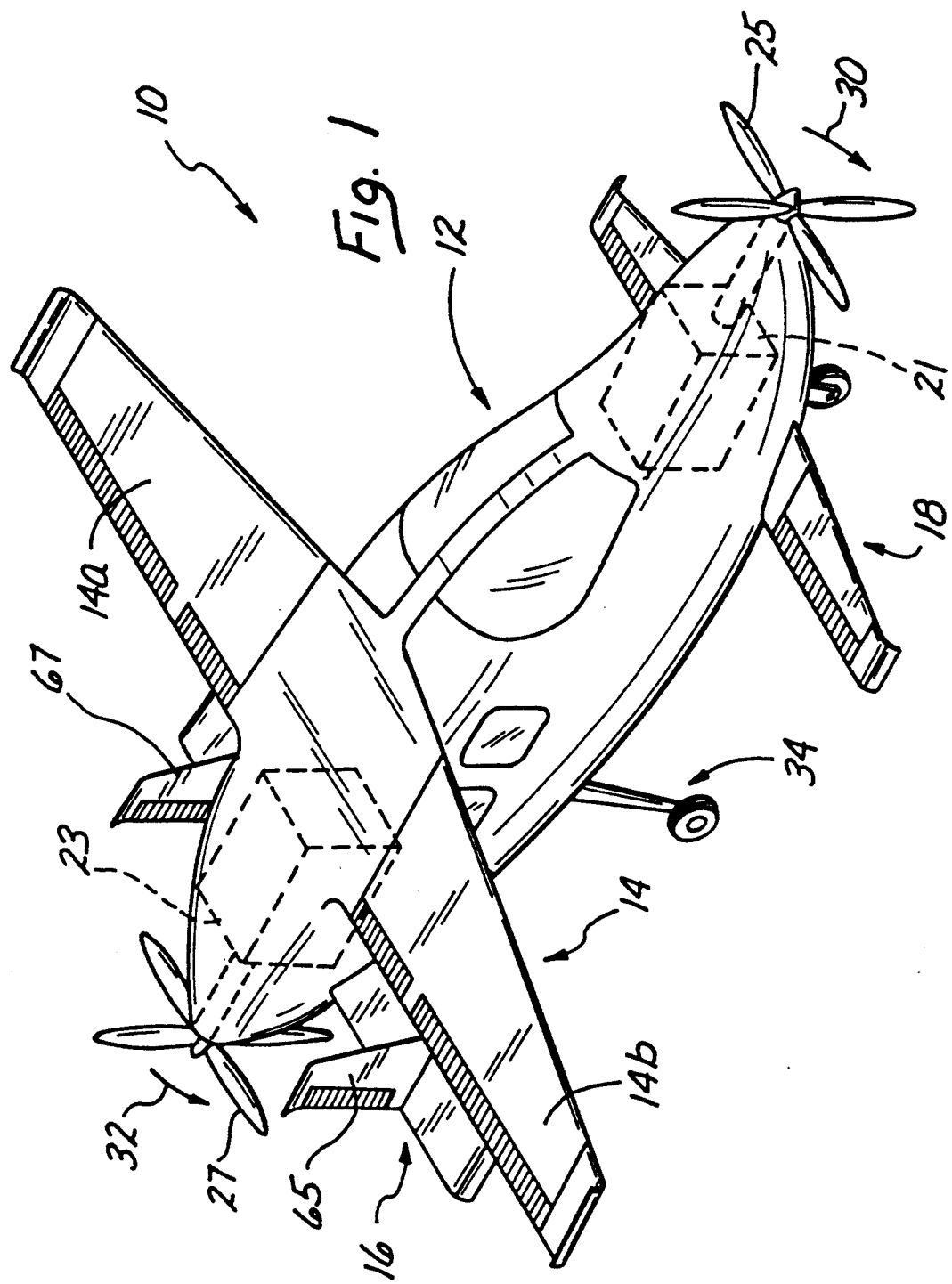
FIG. 1 is a perspective view of one embodiment of the aircraft construction associated with the present invention.

An aircraft is illustrated in FIG. 1 and designated generally by the reference numeral 10. The aircraft includes a fuselage 12, a tail section 16, and a Canard wing 18. Although these wings 14–16 are referred to singularly, it will be understood that each of the wings includes a portion which extends to the left of the fuselage 12 and a portion which extends to the right of the fuselage. Thus the main wing 14 includes a left wing 14a and a right wing 14b.

A pair of engines 21 and 23, disposed in the front and rear of the aircraft respectively, are designed to counter rotate respective propellers 25 and 27 to provide a motive force for the aircraft. For example, the propeller 25 may be rotated counter clockwise (in the direction of arrow 30) to pull the aircraft, while the propeller 27 is rotated clockwise (in the direction of arrow 32) to push the aircraft. Landing gear 34 is provided of the type which maintains the fuselage 12 in a generally horizontal orientation.

As best illustrated in FIG. 4, the fuselage 12 will typically have an offset or S-shaped configuration with a nose section 41, central section 43 and tail section 45. The nose section 41 will typically house the engine 21 and support the wing 18 and propeller 25. Similarly, the tail section 45 will typically house the engine 23 and support the wing 16 and propeller 27. Between the nose section 41 and tail section 45, the central section 43 will typically include the center of gravity 47 and support the main wing 14. This central section 43 may also typically house the cockpit characterized by a windshield 50 and the passenger compartment characterized by the side windows 52.

In the illustrated embodiment, the nose section 41 extends generally forwardly from the bottom of the central section 43 while the tail section 45 extends generally rearwardly from the top of the central section 43. With this configuration both the axes 56 and 58 extend through the central section 43 which has the greatest vertical dimension, as illustrated in the side view of FIG. 4.

With reference to FIG. 4, it is apparent that the propeller 25 defines an axis 56 for the nose section 41 while the propeller 27 defines an axis 58 for the tail section 45. The effect of the rear propeller 27 is greatly increased if the air it receives is generally undisturbed. In a preferred embodiment this advantage is achieved by vertically offsetting the axes 56 and 58. This offset is easily accommodated in an embodiment wherein the fuselage 12 has the S-shape. In such an embodiment, the axis 56 can be aligned with the lower nose section 41 while the axis 58 is aligned with the higher tail section 45.

The highly desirable result is that this axis offset separates the wash associated with the respective propellers 25 and 27. Thus the wash associated with the forward propeller 25 has less affect on the rear propeller 27 than if the axes 56, 58 were aligned. This can be particularly appreciated with reference to FIG. 5 wherein the wash associated with the propeller 25 is represented by a dotted circle 61 and the wash associated with the propeller 27 is represented by a dotted circle 63. From FIG. 5 it is also apparent that the aircraft 10 is generally symmetrical about a vertical plane 59 which includes the axes 56 and 58.

This view also illustrating the vertically offset relationship of the respective wings 14, 16, and 18. In this particular embodiment, the main wing 14 is positioned over the fuselage 12. In this location the wing 14 is disposed above the windows 52 so the passengers have a better view of the ground. The Canard wing 18 is disposed generally beneath the fuselage 12. In this position, the wing 18 is disposed beneath the engine 21 and provides additional support for its weight.

It is desirable that the three wings 14, 16 and 18 be disposed in three separate generally horizontal planes in order that each wing might be disposed out of the slip stream associated with the other wings. In this particular embodiment it is desirable for the tail wing 16 is disposed in a horizontal plane between the main wing 14 and the Canard wing 18. As was the case with the Canard wing 18, it is also desirable for the tail wing 16 to be disposed beneath the engine 23 for the added support. Both of these advantages can be achieved with the S-shaped fuselage 12 which permits the tail wing 16 to be elevated from the Canard wing 18 and still positioned beneath the engine 23.

In the illustrated embodiment, roll stabilization is provided by a pair of vertical stabilizers 65, 67 which can extend transverse to the tail wing 16. In the illustrated embodiment, these stabilizers 65, 67 extend vertically upwardly from the tail wing 16. These stabilizers 65, 67 can be disposed generally anywhere along the tail wing 16 from the fuselage 12 to the outer edges of the wing 16. In the FIG. 5 embodiment, the stabilizers 65 and 67 are disposed generally intermediate the respective portions of the wing 16. The front view of FIG. 5 also best illustrated a preferred embodiment of the landing gear 34 which includes a nose wheel 70 and a pair of main wheels 72 and 74.

Figure 6:
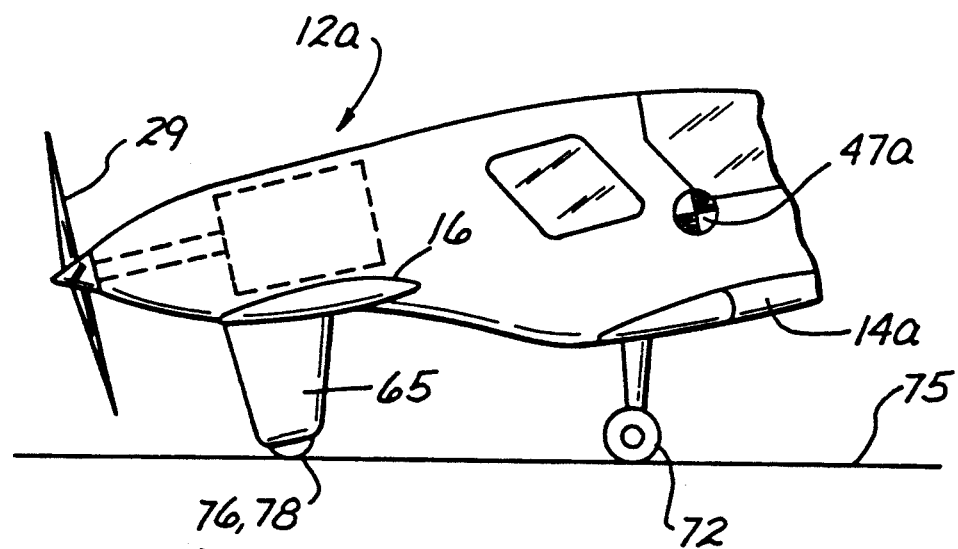
FIG. 6 is a side view of an embodiment including a downwardly extending vertical stabilizer and a drag wheel.

With the rear propeller 27 providing the rearmost element of the aircraft 10, it may be somewhat susceptible to damage during take-off at excessive angles. Under these circumstances, it would be desirable to provide a drag wheel for protecting the rear propeller 27. In the embodiment illustrated in FIG. 6, wherein the ground is designated by the reference numeral 75, the vertical stabilizers 65 and 67 are positioned to extend downwardly from the tail wing 16. At this extended downward position, the stabilizers 65 and 67 provide excellent supports for a pair of drag wheels 76 and 78, respectively. In this location the drag wheels 76, 78 would contact the ground thereby protecting the propeller 27 during take-off at excessive angles.

Figure 7:
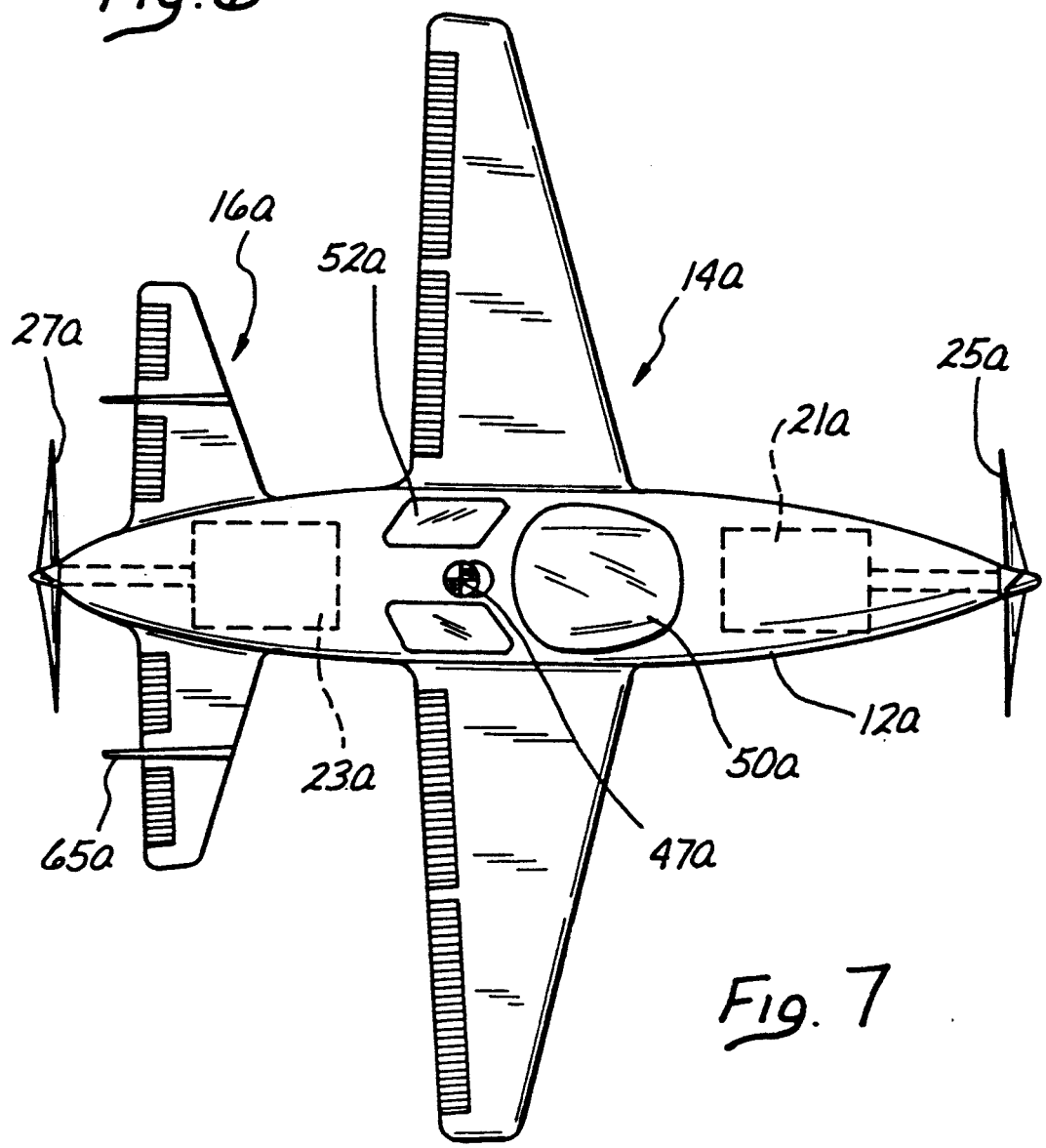
FIG. 7 is a top plan view of a further embodiment of the aircraft construction of the present invention.

A further embodiment of the invention is illustrated in FIGS. 7-9 and includes elements which are similar to those previously discussed. These elements are designated by the same reference numeral followed by the lower case letter "a". Thus in FIG. 7 it can be seen that the aircraft includes the fuselage 12a, main wing 14a and tail wing 16a. Also illustrated in FIG. 7 are the forward engine 21a, rear engine 23a and associated propellers 25a and 27a, respectively. This particular aircraft construction is intended to carry fewer passengers and therefore may not benefit as much from a third wing, such as the Canard wing 18. Nevertheless, the aircraft advantageously includes the two engines 23a and 25a which are vertically offset by the accommodation of a S-shaped fuselage best illustrated in FIG. 8. In this embodiment, the main wing 14a may be advantageously located beneath the fuselage 12a in the central section 43a, with both the main wing 14a and the tail wing 16a positioned beneath the center of gravity 47a.

Figure 2:
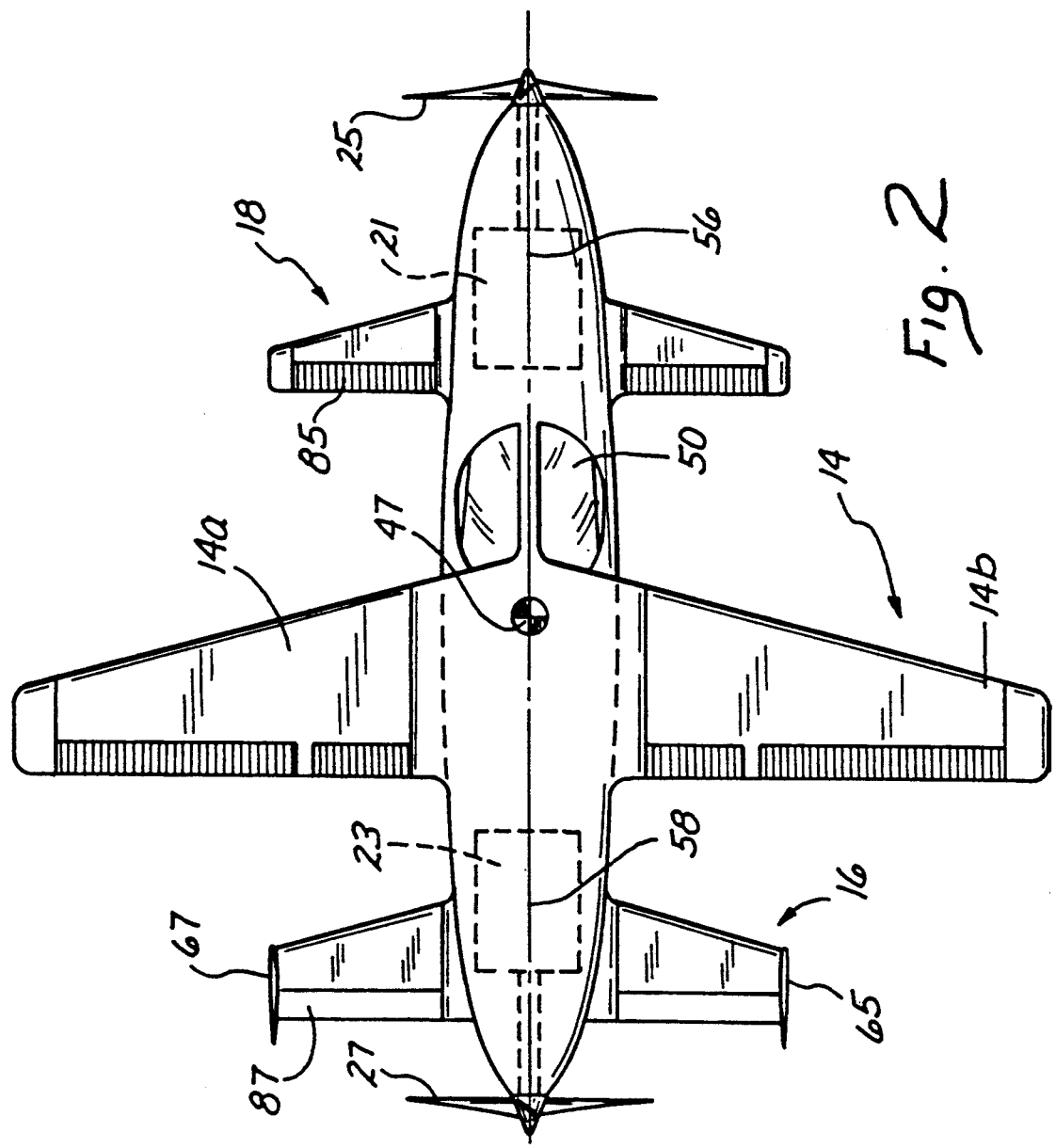
FIG. 2 is a top plan view of the embodiment illustrated in FIG. 1.
Figure 3:
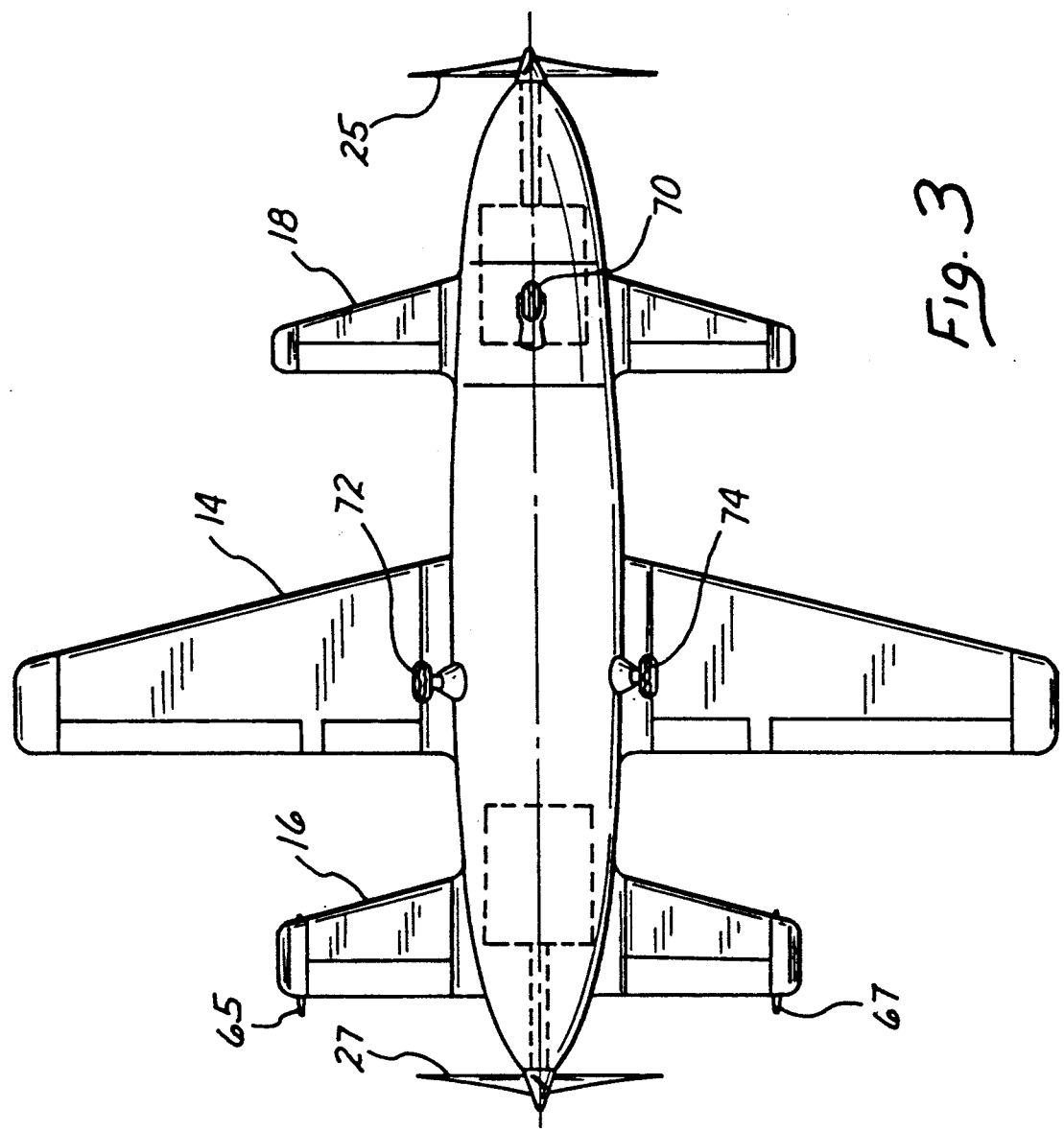
FIG. 3 is a bottom plan view of the aircraft illustrated in FIG. 1.

The three wing embodiment of the present invention offers further advantages in the control of the aircraft. As best illustrated in FIG. 2, the Canard wing 18 includes ailerons 85 while the tail wing 16 includes ailerons 87. In this particular embodiment, the ailerons 85, 87 can be mechanically coupled to operate simultaneously from a single aileron control in the cockpit. Thus, to produce an upward pitch in the aircraft 10, the ailerons 85 of the Canard wing 18 would pivot downwardly while the ailerons 87 of the tail wing 16 would simultaneously pivot upwardly. Similarly, to produce a downward pitch on the aircraft, the ailerons 85 on the Canard wing 18 would pivot upwardly while the ailerons 87 on the tail wing 16 would simultaneously pivot downwardly. Thus, the pitch of both the nose section 41 and tail section 45 of the aircraft 10 would be simultaneously controllable from a single aileron control in the cockpit.

From the foregoing discussion it will be apparent that other embodiments of the concept can also benefit from the advantages previously discussed. For example, engines other than propeller driving engines could be used in a particular embodiment. Other shapes for the fuselage 12 could provide the desired vertical offset for the axes 56 and 58. Other transverse orientations of the vertical stabilizers 65, 67 relative to the tail wing 16 will also be apparent. Structure other than the vertical stabilizers 65, 67 may also be provided to support drag wheels at a sufficient downward location to prevent damage to the rear propeller 27 during take-off. The relative horizontal positions of the respective wings 14-18 may also be varied in a particular embodiment. For example, the Canard wing 18 may be disposed in a horizontal plane between the main wing 14 and the tail wing 16. Alternatively, the Canard wing might be disposed on top of the fuselage 12 with the main wing 14 positioned below the fuselage 12.

Given these wide variations, which are all within the scope of this concept, one is cautioned not to restrict the invention to the embodiments which have been specifically disclosed and illustrated, but rather encouraged to determine the scope of the invention only with reference to the following claims.

I claim:

1. An aircraft construction, including:
    a fuselage having a front section, a center section, and a rear section, the fuselage extending longitudinally relative to a roll axis and transverse to a pitch axis, and a yaw axis, the axes intersecting at a center of gravity of the aircraft;
    a first engine disposed in the front section of the fuselage, the first engine being positioned in a vertical plane defined by the roll axis and the yaw axis;
    a second engine disposed in the rear section of the fuselage the second engine being positioned in offset relationship with the first engine in the vertical plane;
    a main wing fixed to the center section of the fuselage and disposed above the center of gravity between the front section and the rear section;
    a tail wing fixed to the rear section of the fuselage and being vertically offset from the main wing; and
    a Canard wing fixed to the front section of the fuselage and being vertically offset from the main wing and the tail wing.

2. The aircraft construction recited in claim 1 further comprising at least one vertical stabilizer extending from the tail wing outboard of the fuselage.

3. The aircraft construction recited in claim 2 wherein the vertical stabilizer extends below the tail wing and the aircraft further comprises a tail wheel mounted on the vertical stabilizer.

4. The aircraft construction recited in claim 1 wherein the tail wing comprises:
    at least one wing element extending from the fuselage to an outboard edge; and
    a vertical stabilizer disposed on the wing element outboard of the fuselage.

5. The aircraft construction recited in claim 4 wherein the vertical stabilizer is disposed at the outboard edge of the tail wing element.

6. The aircraft construction recited in claim 4 wherein the vertical stabilizer extends downwardly from the wing element and the aircraft further comprises a wheel attached to the vertical stabilizer.

7. The aircraft construction recited in claim 1 wherein:
    the first engine is disposed to pull the fuselage when the aircraft is in flight; and
    the second engine is disposed to push the fuselage when the aircraft is in flight.

8. An aircraft, comprising:
    a fuselage having a longitudinal configuration with a forward section and a rearward section, the forward section extending along the length of the fuselage and disposed generally along a first axis, the rearward section extending along the length of the fuselage and disposed generally along a second axis having a spaced generally parallel relationship to the first axis;
    a first engine disposed along the first axis of the forward section of the fuselage and operable to rotate a first propeller to pull the fuselage;
    a second engine disposed along the second axis of the rearward section of the fuselage and operable to rotate a second propeller to push the fuselage;
    the second axis being different than the first axis so that the second propeller receives air which is removed from the wash of the first propeller;
    a main wing disposed generally in a first plane and extending laterally of the fuselage above the center of gravity of the aircraft;
    a tail wing disposed generally in a second plane different than the first plane and extending laterally of the rearward section of the fuselage, forwardly of the second engine;
    a canard wing disposed generally in a third plane different than the first plane and the second plane laterally opposing sides of the forward section of the fuselage; and
    a pair of vertical stabilizers each extending transverse to an associated one of the tail wings.

9. The aircraft recited in claim 8 further comprising a drag wheel extending from each of the vertical stabilizers.

10. The aircraft recited in claim 8 wherein the vertical stabilizers extend vertically downwardly from the tail wing.

11. The aircraft recited in claim 8 wherein the first plane is disposed generally above the fuselage.

12. The aircraft recited in claim 11 wherein the third plane is disposed generally beneath the fuselage.

13. The aircraft construction recited in claim 7 wherein:
    the first engine has an axis which is substantially parallel to the roll axis of the fuselage; and
    the second engine has an axis which is substantially parallel to the axis of the first engine.

* * * * *